United States Patent [19]
Ratz et al.

[11] Patent Number: 5,257,761
[45] Date of Patent: Nov. 2, 1993

[54] ASSEMBLY AND METHOD FOR ATTACHING A PRESSURE VESSEL TO ANOTHER OBJECT

[75] Inventors: Otto G. Ratz; Richard E. Rynders, both of Salt Lake County, Utah

[73] Assignee: Hercules Incorporated, Wilmington, Del.

[21] Appl. No.: 840,953

[22] Filed: Feb. 24, 1992

[51] Int. Cl.⁵ .................................................. B64G 1/40
[52] U.S. Cl. ...................................... 244/172; 244/54; 156/172
[58] Field of Search .................... 244/123, 117 R, 119, 244/131, 133, 132, 158 R, 172, 54; 156/187, 172, 173, 175, 191; 220/414, 453, 455; 114/357, 345, 343, 292

[56] References Cited

U.S. PATENT DOCUMENTS

| | | | |
|---|---|---|---|
| 3,070,329 | 12/1962 | Hasbrouck | 244/52 |
| 3,251,500 | 5/1966 | Archbold | 156/172 |
| 3,280,850 | 10/1966 | Gorcey et al. | 156/172 |
| 3,371,488 | 3/1968 | Turner | 60/200 |
| 3,532,304 | 10/1970 | Pyptiuk | 244/52 |
| 3,574,080 | 4/1971 | Jones et al. | 204/197 |
| 3,661,670 | 5/1972 | Pierpont, Jr. | 156/172 |
| 3,809,590 | 5/1974 | Fantini et al. | 156/172 |
| 3,886,016 | 5/1975 | Gilbu | 156/172 |
| 3,925,132 | 12/1975 | Bartlow et al. | 156/172 |
| 4,892,435 | 1/1990 | Anderson | 403/374 |
| 4,904,109 | 2/1990 | Anderson | 403/374 |
| 4,909,659 | 3/1990 | Anderson | 403/376 |
| 4,936,525 | 6/1990 | Daffix et al. | 156/172 |
| 5,117,758 | 6/1992 | Renzi | 244/172 |

FOREIGN PATENT DOCUMENTS 0241900  9/1990  Japan .................................. 244/172

Primary Examiner—Galen Barefoot
Attorney, Agent, or Firm—Mark Goldberg

[57] ABSTRACT

An attachment assembly for connecting a pressure vessel to another object, but preferably for connecting rocket motors to one another, including several successive layers, which are arranged in the following order: first, a reinforcement section on an outer casing of a first pressure vessel; second, a layer of resilient shear ply material adhered to the outermost surface of the reinforcement section; third, a saddle positioned over the shear ply; fourth, an overwrap which secures the saddle to the shear ply; fifth, a plurality of lugs which are secured to the saddle; sixth, a connecting means attached to one of the lugs; seventh, a strut wherein a first end thereof is attached to at least one of the lugs; and, eighth, a attachment means for connecting a second end of the strut with a second pressure vessel. The method includes constructing the reinforcement section; adhering the shear ply to the reinforcement section; positioning the saddle over the shear ply and attaching lugs to the saddle; applying an overwrap over the saddle; attaching a connecting means to one of the lugs; connecting a strut to both the connecting means as well as to the second pressure vessel.

22 Claims, 4 Drawing Sheets

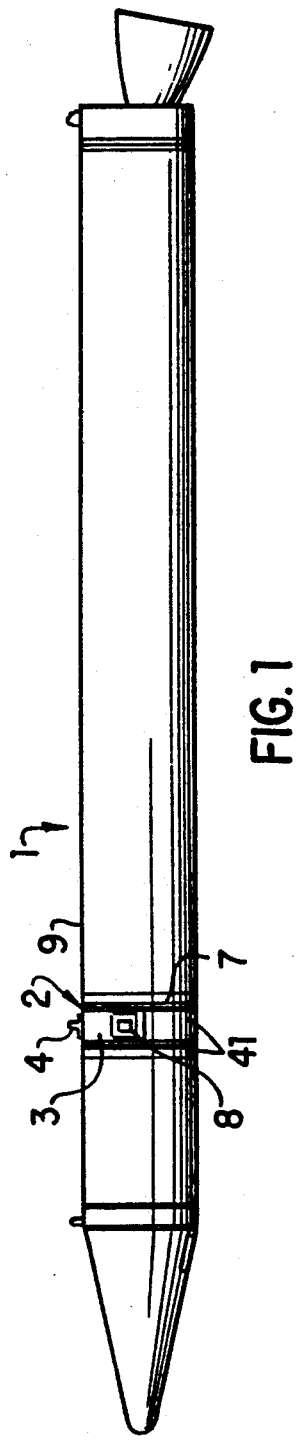
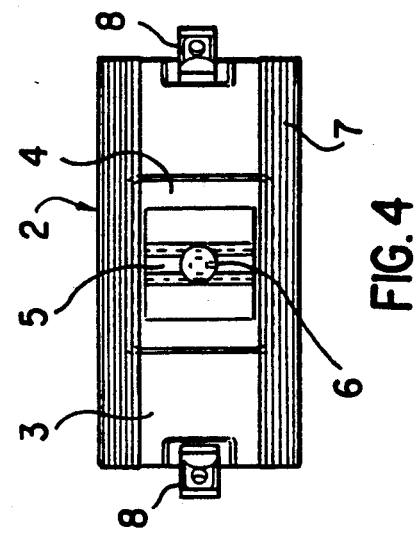
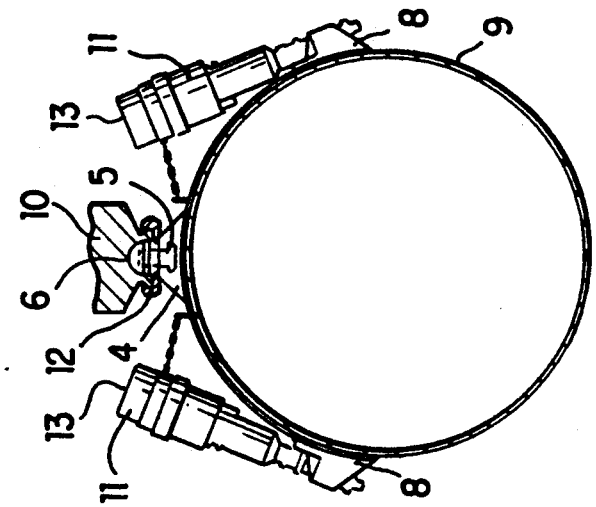
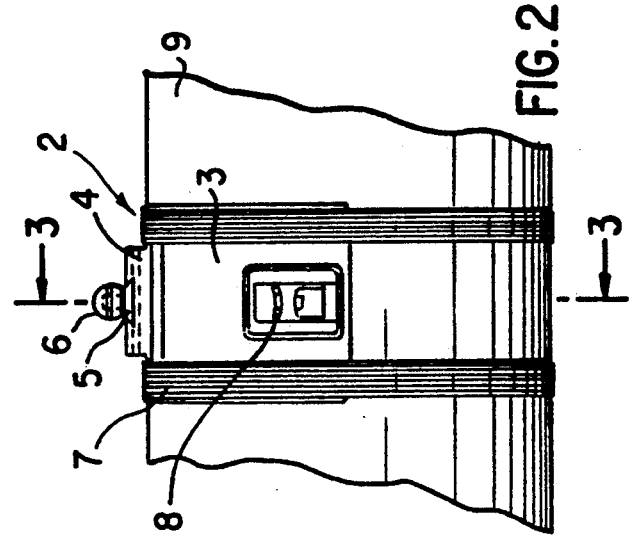

ASSEMBLY AND METHOD FOR ATTACHING A PRESSURE VESSEL TO ANOTHER OBJECT

BACKGROUND OF THE INVENTION

1. Field of the Invention

The present invention pertains to the field of fasteners, and is especially applicable to fastening a pressure vessel to another object, especially another pressure vessel. The present invention pertains especially to means for fastening two rocket motors to one another, for example a booster rocket motor to a main rocket motor.

2. Background of the Invention and Material Information

The assembly and process of the present invention are especially related to the art of fastening rocket engines to one another. Multi-engine rocket-powered aircraft are well known. More than one rocket engine in a single aircraft (or spacecraft) can be utilized to extend the range and/or speed and/or payload of the craft. The addition of separate rockets can also be used to produce added directional control or special maneuverability, spin, etc., to the craft. Most commonly, one or more booster rocket engines are employed along side a main rocket engine, in order to increase the thrust.

U.S. Pat. No. 3,070,329 (HASBROUCK) relates to directional control for rockets. HASBROUCK utilizes a plurality of independent movable steering rockets which are fastened along side the main rocket engine, and which exert a steering thrust at an acute angle to the line of thrust of the main propulsive nozzle. The steering rockets are affixed to the main rocket with gimbal joints, as well as a supporting ring which is lugged. Two struts, comprising ball and socket joints on the respective ends thereof, are affixed to the steering rocket and the main rocket. The purpose of the steering rockets is to provide a means for steering the main rocket in the desired direction, and this is why the gimbal joint is utilized in fastening the steering rocket to the main rocket.

U.S. Pat. No. 3,532,304 (PYPTIUK) relates to rocket powered space vehicles in which four rocket motors ar equally spaced around the roll axis of the vehicle, universally mounted on a common frame. Each motor is separately mounted to a tubular thrust ring by means of a coupling. The coupling may be a ball and socket joint, and the coupling permits the motor to pivot relative to the thrust ring. The arms which connect the rocket nozzles to the non-pivoting portion of the machine may also be fitted with ball and socket joints.

U.S. Pat. Nos. 4,892,435, 4,904,109, and 4,909,659, all in the name of Robert ANDERSON, relate to interlocking structural members employing transverse locking wedges or locking means. ANDERSON fastens composite materials together. The composite materials comprise polymers having reinforcing fibers therein. All three of these patents are particularly directed at aircraft wing skins which are attached to a support substructure. The means of attachment is a fastenerless joint. Fastenerless joints are utilized in order to avoid the problem of leaks which are common when rivets are used to attach the aircraft wing skin to the supporting substructure. Fastenerless joints also avoid passing rivets through various plies of the laminated structure, a practice which can cause rupture of the wing skin. ANDERSON's fastenerless joint comprises a wedge which interlocks a wing skin structure to a support substructure. The wing skin laminate has hollowed projections for receiving mating recesses in the composite wing substructure. The wedge is forced into the hollow projections after the projections are interdigitated with the mating recesses in the composite wing substructure. The wedges are transversely positioned across the mating recesses, and extend therefrom axially, so that they serve to lock the wing skin structure to the supporting substructure.

It is important to utilize lightweight but structurally strong components in building rocket engines, in order to improve the thrust-to-weight ratio, and thereby to increase the payload capacity and/or the range and/or the speed of travel of the rocket. To this end, composite materials (i.e., fiber reinforced resins) have been developed and utilize extensively throughout the aeronautical industry.

Even the outer casing (i.e. housing or "skin") of the body of a craft can be made from such fiber reinforced composite materials. Some of these materials have a strength to weight ratio significantly higher than many of the metals traditionally used in the manufacture of aircraft body panels.

Still, it remains important to keep the craft as light as possible, to enhance the payload, range, and speed of the craft. Accordingly, such elements as the outer casing of a rocket engine are manufactured to as thin a gauge as possible, while simultaneously maintaining an adequate margin against structural failure, taking into account the various forces to which the casing will be subjected.

The outer casings of solid propellant rockets are typically manufactured thin enough that the internal pressure produced by the operation of the engine is high enough to cause the circumference of the casing to increase in size by about 1 percent. Such an increase can create tremendous shear forces at fixed points on the casing, for example, if the casing is fastened to another rocket engine with a rigid connection at a fixed location. Large shear forces either risk structural failure or require greater weight in order to achieve a level of structural strength to carry the force. Such shear forces can be especially troublesome if the casing is made of a fiber-reinforced polymeric resin, since the fibers are generally laid down in layers having a directional orientation and hence are much stronger in some directions than others. The layers having fibers oriented in the weakest orientation with respect to the direction of shear are subject to much increased risk of failure, which could cause a failure throughout the entire thickness of the casing.

SUMMARY OF THE INVENTION

The present invention relates to an attachment assembly for fastening a pressure vessel to another object. In general, the attachment assembly comprises:

A. a pressure vessel wall reinforcement section on an outer casing of the pressure vessel;
B. a layer of shear ply positioned over the reinforcement section;
C. a saddle positioned over the shear ply, wherein the saddle has at least two lugs thereon;
D. an overwrap positioned over at least a portion of the saddle; and
E. a connecting means for connecting a first end of a strut to at least one of the lugs.

The pressure vessel wall reinforcement section comprises a plurality of layers of fiber embedded in a resin. The layers of fiber are positioned across one another, preferably at an angle of from about 0 degrees to about 90 degrees. The shear ply is constructed from a resilient material, wherein an adhesive adheres the shear ply over an outermost fiber-reinforced resin layer of the reinforcement section. The shear ply is resilient enough to prevent damage to the casing of the first pressure vessel during a period of use of the pressure vessel. The saddle has at least two lugs thereon, wherein the lugs are attached to the saddle with a means for attachment thereof. The overwrap secures the saddle against the shear ply. A second end of the strut is connected to the other object with an attachment means therefor.

Preferably the pressure vessel is a first pressure vessel (most preferably a solid propellant booster rocket engine), and preferably the "other object" is a second pressure vessel (most preferably a liquid propellant main rocket engine).

The present invention also relates to an attachment assembly for fastening a pressure vessel to another object, wherein the attachment assembly comprises:

A. a means for reinforcing a section of a pressure vessel wall on an outer casing of the pressure vessel;

B. a means for absorbing shear forces produced by the expansion of the outer casing of the pressure vessel during a period of use of the pressure vessel;

C. a means for providing at least two points of attachment to the pressure vessel, wherein the means for providing at least two points of attachment to the pressure vessel is positioned over the means for reinforcing the pressure vessel wall;

D. a means for securing in place the means for providing at least two points of attachment to the pressure vessel; and E. a connecting means for connecting a first end of a strut to at least one of the attachment points, wherein a second end of the strut is connected to the other object with an attachment means therefor.

Furthermore, the present invention relates to a method of attaching a pressure vessel to another object. The method comprises the steps of:

A. constructing a pressure vessel wall reinforcement section on an outer casing of the pressure vessel;

B. adhering a layer of a shear ply over an outermost layer of the reinforcement section;

C. positioning a saddle over the shear ply;

D. attaching at least two lugs onto the saddle;

E. applying an overwrap over at least a portion of the saddle so that the saddle is secured against the shear ply;

F. attaching a connecting means to at least one of the lugs;

G. connecting a first end of a strut to the connecting means; and

H. connecting a second end of the strut to the other object.

The wall reinforcement section comprises a plurality of layers of fiber embedded in a resin. The layers of fiber comprise fibers which are oriented parallel to one another, in which entire layers of fiber are positioned across one another, and/or the fibers within a given layer are positioned across one another, i.e. not parallel to one another. The shear ply is constructed from a resilient material, wherein an adhesive adheres the shear ply to the outermost layer of the reinforcement section. The shear ply is resilient enough to prevent damage to the casing of the pressure vessel during a period of use of the pressure vessel.

The assembly and process of the present invention allow for the use of a relatively lightweight pressure chamber outer casing which has an assembly thereon for attaching the pressure chamber to another object. The assembly is constructed in such a manner that even if the outer casing is made in such a manner that a 1 percent, increase (or greater) in circumference is produced upon pressurization of the chamber, there is no substantial risk of producing shear forces which will rupture the casing. Rather, the attachment assembly is constructed to avoid the production of shear forces which have a substantial risk of producing structural failure of the casing during operation of the pressure chamber. The attachment assembly is also constructed to enable the casing to be relatively lightweight, in comparison with the weight required to ensure no substantial chance of structural failure, if a conventional attachment assembly (i.e. a bolt, etc.) is utilized.

It is an object of the present invention to permit the use of a lightweight outer casing in a pressure vessel having an assembly thereon for attachment of the pressure vessel to another object.

It is a further object of the present invention to permit the use of a lightweight outer casing for a pressure vessel, wherein the casing is substantially free of risk of structural failure while having an assembly thereon for attachment of the pressure vessel to another object.

It is a further object of the present invention to provide an attachment assembly which can be attached to a rocket housing at any desired axial attachment point, especially a point which corresponds to an internal region which is pressurized during operation of the rocket motor.

It is a further object of the present invention to provide an attachment assembly which can attach to the outside of a pressure vessel.

It is a further object of the present invention to provide an attachment assembly for a pressure vessel, in which the attachment assembly permits movement of the relative positions of the pressure vessel with respect to the other object.

It is a further object of the present invention to provide an attachment assembly which is secure in holding the pressure vessel but which also permits the pressure vessel to be detachably engaged with the other object.

It is a further object of the present invention to provide an attachment assembly which is easy to assemble and which is also light in weight.

It is a further object of the present invention to provide an attachment assembly for a pressure vessel casing, wherein the casing is made from a fiber-reinforced polymeric material.

It is a further object of the present invention to provide an attachment assembly for attaching at least two rocket engines to one another.

It is a further object of the present invention to provide an attachment assembly for attaching one rocket engine to another rocket engine, wherein the attachment means is flexible enough to accommodate the expansion and contraction which accompany the normal use of the rocket engines, while also substantially avoiding the production of an amount of shear which poses a substantial risk of structural failure to the casing of either rocket engine.

It is a further object of the present invention to provide an attachment assembly wherein the assembly comprises a saddle which extends only partially around the casing.

It is a further object of the invention to provide an attachment assembly wherein a saddle member rests upon a flexible, resilient member, so that destructive shear forces are avoided.

BRIEF DESCRIPTION OF THE DRAWINGS

FIG. 1 is a longitudinal side view of a booster rocket having a portion of the attachment assembly of the present invention thereon.

FIG. 2 is an enlarged longitudinal side view of a portion of the rocket illustrated in FIG. 1.

FIG. 3 illustrates a cross-sectional view of a portion of the rocket illustrated in FIG. 2, taken through line 3—3 of FIG. 2.

FIGS. 4 illustrates a top view of a portion of the rocket having thereon a portion of the attachment assembly of the present invention.

FIG. 5 is taken from an end view of the rocket.

DETAILED DESCRIPTION OF THE PREFERRED EMBODIMENTS

Figure 6:
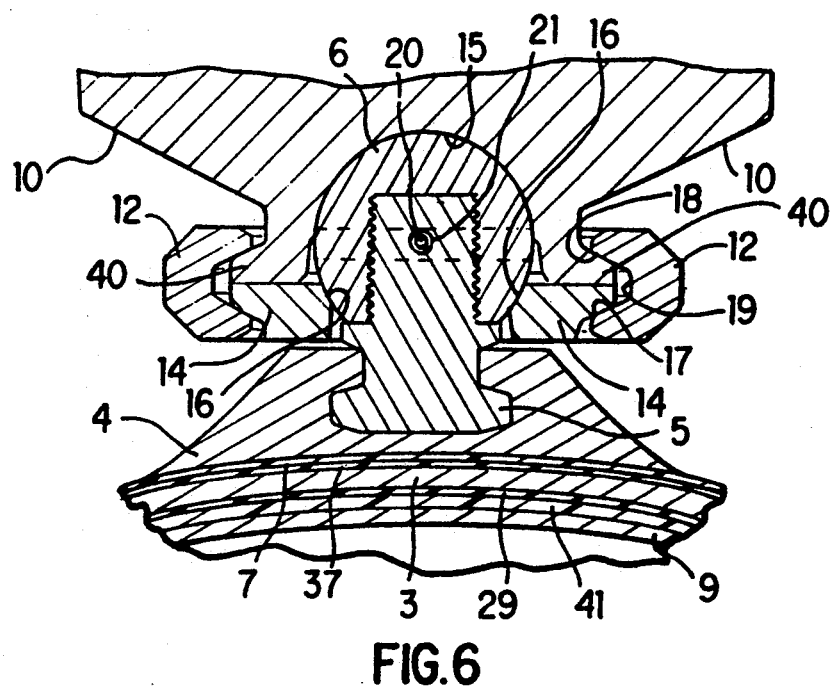
FIG. 6 illustrates an enlarged cross-sectional view of a center lug assembly of a preferred embodiment of the present invention.

FIG. 1 illustrates a side view of a rocket (1) having a portion of the attachment assembly (2) thereon. The rocket has an outer casing (9) thereon. The attachment assembly (2), as illustrated in FIG. 1, comprises a wall reinforcement section (41), a saddle (3), a center lug (4), an overwrap (7), and a side lug (8).

FIG. 2 illustrates an enlarged view of the attachment assembly (2) of FIG. 1. FIG. 2 provides enlarged views of the saddle (3), the center lug (4), a T-element (5), a ball element (6), the overwrap (7), the side lug (8), and the outer casing (9).

FIG. 3 illustrates a cross-sectional view of the rocket taken through line 3—3 of FIG. 2, with additional elements shown which are not included in FIG. 2. FIG. 3 illustrates the relative arrangement of: the center lug (4), the T-element (5), the ball element (6), two side lugs (8), the outer casing (9), a portion of a strut member (10), two thrusters (11), and an annular clamp element (12).

The thrusters (11) apply pressure between the main rocket (not shown) and the side lugs (8), the thrusters keeping the booster rocket in a fixed position with respect to the main rocket. As can be seen in FIG. 3, the thrusters are chained to the saddle (3). The thrusters are chained to the saddle in order to adequately secure the thrusters so that they do not move in an uncontrolled manner upon detachment of the booster, an event which could damage the main rocket or the housing of the booster rocket. Although not shown in FIG. 3, the other end (13) of each of the thrusters (11) is placed into contact (i.e., either directly or indirectly) with the outer casing of the main rocket engine (not shown).

FIG. 4 illustrates a top view of the attachment assembly (2) illustrated in FIG. 1. The saddle (3) provides a surface upon which are mounted the center lug (4) and two side lugs (8). The T-element (5) is shown atop the center lug (4), and the ball element (6) is positioned over the T-element (5). The overwrap (7) is positioned over both a portion of the saddle (3) as well as a portion of the center lug (4).

Figure 5:
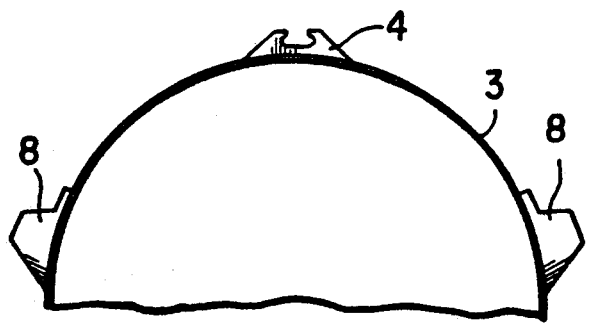
FIG. 5 illustrates an enlarged view of a portion of the attachment assembly illustrated in FIG. 1.

FIG. 5 illustrates a side view of the saddle (3) having a center lug (4) and two side lugs (8) thereon. FIG. 5 illustrates the saddle (3) and the lugs unitary therewith, without illustrating any other elements of the attachment assembly. The view shown in FIG. 5 is taken from an end of the rocket.

FIG. 6 illustrates an enlarged view of the center lug (4) and the attachment of the strut member (10) thereto. The T-element (5) is slidably engaged within a slot in the center lug (4). A ball-and-socket joint is formed by the ball element (6) in combination with a socket. The socket is formed from at least two elements:

{1} a concave surface (15) within the end of the strut (10), and

{2} a ring element (14) having an inner concave surface (16) which mates with the curvature of the ball element (6).

The ring element (14) is forced against the ball element (6) through the tightening of an annular clamp element (12). The annular clamp element (12) has a groove (19) with beveled sides into which are positioned a mating surface (17) on the ring element (14) as well as a mating surface (18) on a flared end (40) of the strut member (10). The annular clamp (12) is preferably present in the form of a ring which is closed by a bolt (not shown) which threadably engages a nut affixed to the ring, so that the clamp is drawn towards a closed position, i.e. so that the clamp is tightened against and over both the ring member (14) and the flared end (40) of the strut member (10).

A set screw (20) is threadedly engaged into a hole (21) in the ball element, in order to lock the threads on the T-element (5) into mating threads within the ball element (6).

FIG. 6 also illustrates the various layers of material which are present on the outer casing (9) of the pressure vessel. Positioned immediately over the outer casing (9) of the pressure vessel is a set of fiber-reinforced resin layers (41). Positioned over the layers of fiber-reinforced resin (41) is a layer of shear ply (29), which is constructed from a resilient material, such as rubber. Positioned immediately over the layer of shear ply (29) is the saddle (3). A supplemental (i.e. optional but preferred) layer of shear ply (37) is positioned immediately over the saddle (3). Finally, the overwrap (7), which is a composite comprising multiple layers of fiber embedded in resin (see FIG. 13), is positioned over the supplemental layer of shear ply (37).

Figure 7:
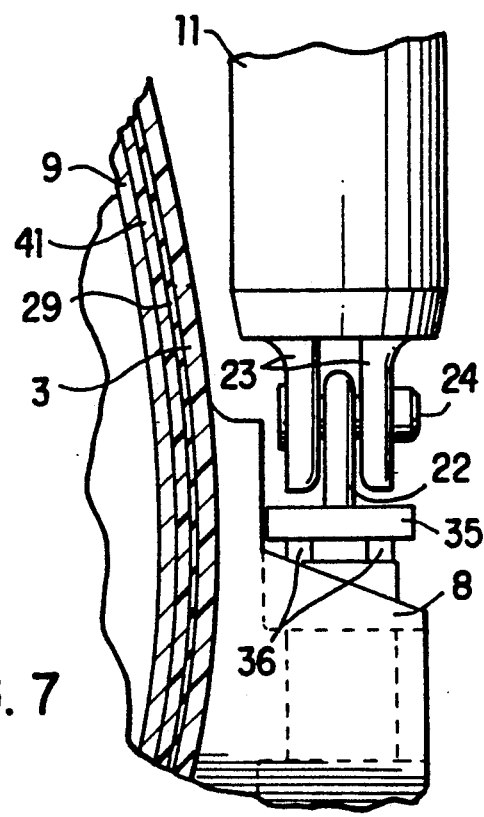
FIG. 7 illustrates an enlarged cross-sectional view of a side lug portion of the present invention, together with a thruster connected thereto.

FIG. 7 illustrates an enlarged view of a side lug (8) having a thruster (11) connected thereto. A tang pin (22) is hingedly attached to two clevis posts (23) via a retaining pin (24) which passes through both of the clevis posts (23) as well as through the tang pin (22). The arrangement of the tang pin, the clevis posts, and the retaining pin is commonly referred to as a tang and clevis joint.

The tang pin (22) is secured (preferably welded) to an anchor plate (35). To the anchor plate (35) is secured (again, preferably welded) a retaining shaft (36) which is adjustably mounted within a passageway through the side lug (8). Preferably the retaining shaft (36) is threadedly engaged with the threaded passageway through the side lug (8). However, it is most preferred that the retaining shaft has a rotatable housing thereover (not illustrated), wherein the housing is smooth on its interior surface and threaded on its exterior. The smooth interior of the housing has an elevated section therein which is permanently keyed into an annular groove in the retaining shaft (36). Since the exterior of the housing is threadedly engaged with the threaded interior surface of the side lug (8), this arrangement allows for a high degree of adjustment of the position of the thruster with respect to the side lug (8). The thruster (11) applies pressure to the side lug (8) by applying pressure through the following series of parts: (11)—(23)—(24)—(22)—(35)—(36)—(8).

As in FIG. 6, FIG. 7 also illustrates the various layers positioned over the outer casing (9) of the pressure vessel, such as the fiber-reinforced resin layer (41), the shear ply (29), and the saddle (3). For purposes of clarity, the upper layer of shear ply (37) and the overwrap (7) are not illustrated in FIG. 7.

Figure 8:
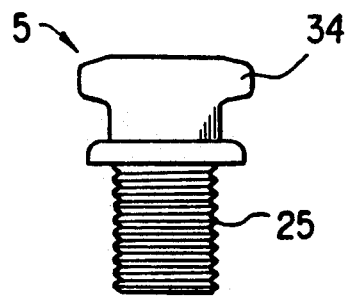
FIG. 8 illustrates an end view of a preferred T-element to be utilized in the connecting means in the assembly of the present invention.

FIG. 8 illustrates an end view of a preferred embodiment of a connecting member (5), this preferred embodiment herein termed a "T-element". The T-element (5) illustrated in FIG. 8 represents a cross-sectional shape which mates with the slot in the center lug (4) illustrated in FIG. 5. That is, the "head" (34) of the T-element (5) as illustrated in FIG. 8 mates with the slot in the center lug (4) illustrated in FIG. 5.

Figure 9:
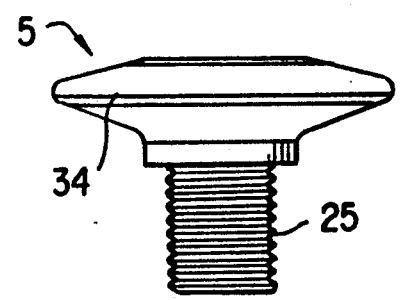
FIG. 9 illustrates a side view of a preferred T-element to be utilized in the connecting means in the assembly of the present invention.

FIG. 9 illustrates a side view of this same T-element upon a 90° rotation of the T-element of FIG. 8 along the axis of the threaded portion thereof. The view of FIG. 9 illustrates the side surface of the T-element which contacts the slot surfaces of the center lug (4).

Figure 10:
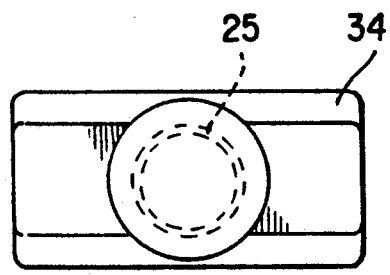
FIG. 10 illustrates a top view of a preferred T-element in combination with a preferred ball element, the combination to be utilized in the connecting means in the assembly of the present invention.

FIG. 10 illustrates a top view of the T-element threadedly engaged into the ball element (6). The view illustrated in FIG. 10 clearly illustrates the reason for the difference between the side views of FIGS. 8 and 9. That is, the head (34) of the T-element has a length substantially greater than its width.

Figure 11:
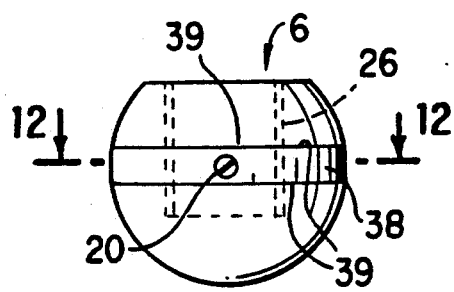
FIG. 11 illustrates a side view of a ball element to be utilized in the attachment assembly of the present invention.
Figure 12:
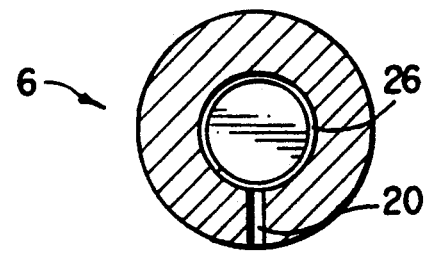
FIG. 12 illustrates a cross-sectional view of the ball element illustrated in FIG. 11, taken through line 12—12 thereof.

FIG. 11 illustrates the ball element (6) which has threaded internal surface (26) which threadedly engages the threaded sections (25) of the T-element (5). A threaded passageway (21) is preferably provided within the ball element (6), as is illustrated in FIG. 11. The threaded passageway (21) is provided in order that a set screw (20) may be threadedly engaged therein, for locking the threads (26) of the ball element (6) to the threads (25) of the T-element (5). The region (38) between the horizontal lines (39) across the ball member (6) is a "flat", i.e. no spherical curvature is present here. The flat is present in order to ensure a clean detachment of the strut (10) from the ball element (6).

Detachment of the strut (10) from the ball element (6) is carried out by using an "exploding bolt" (not illustrated) for closing the annular clamp (12, as illustrated in FIG. 6) around both the flared end (40) of the strut (10) and the ring member (14). Upon exploding the bolt, the ring formed by the annular clamp (12) opens, and the ball member (6) is permitted thereafter to separate from the strut (10), thereby allowing, for example, a booster rocket to which the attachment assembly is attached, to separate from the central rocket engine (not shown).

Figure 13:
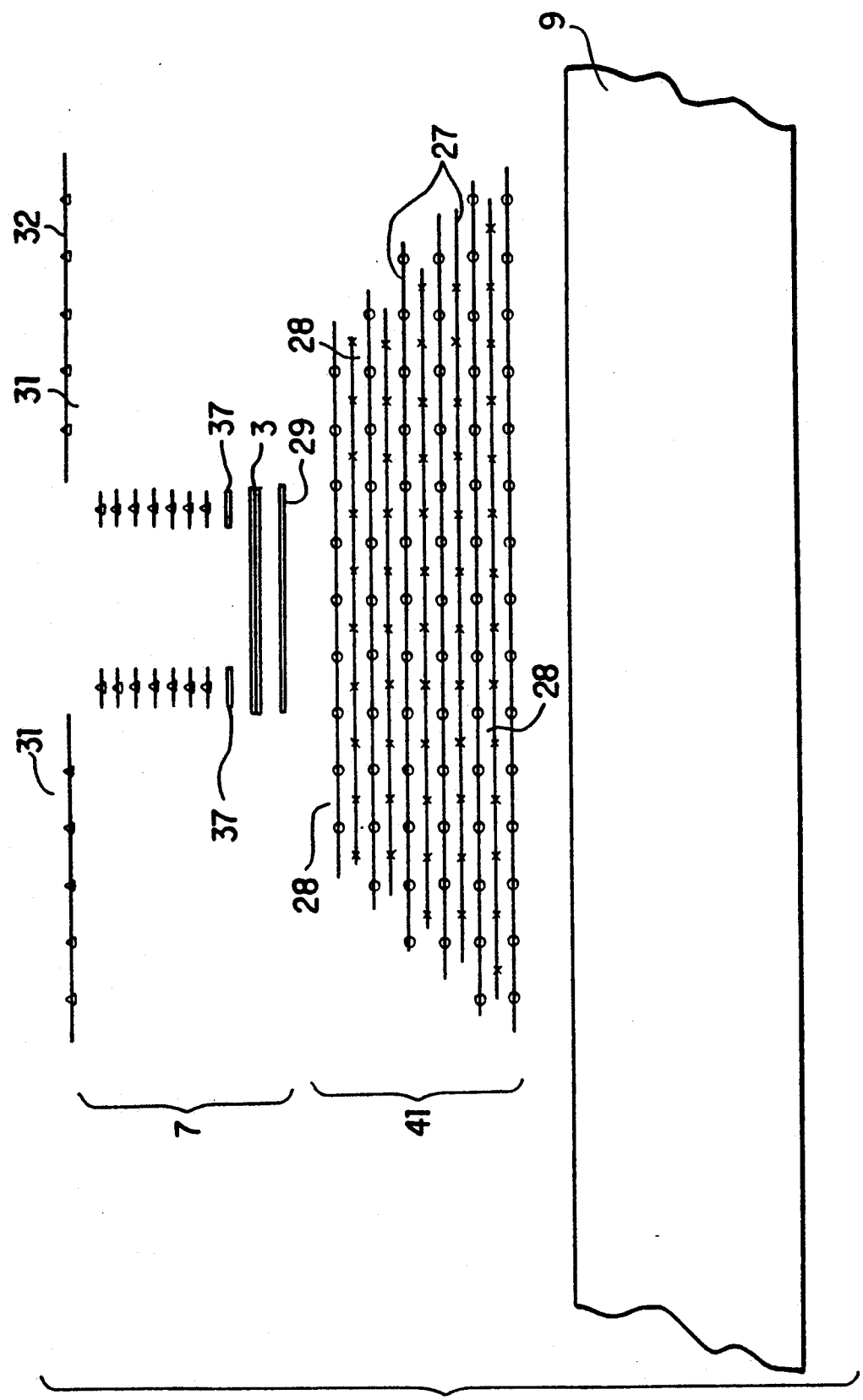
FIG. 13 illustrates an exploded, diagrammatic, cross-sectional view of a pressure vessel wall reinforcement section to be utilized in the attachment assembly of the present invention.

FIG. 13 illustrates an exploded diagrammatic cross-sectional view of the attachment assembly of the present invention. A plurality of parallel layers (27) of fiber are shown positioned directly over the outer casing (9). Each of the layers (27) designated "O" extend into the plane of the figure, i.e., around the circumference of the outer casing (9) of the rocket, in a direction generally perpendicular to the axis of the rocket. Each of the layers (27) designated "X" are actually two discrete fibrous layers, each of which is generally oriented 45° to the circumferential fibers. These two discrete, angled fiber layers are oriented approximately 90° with respect to one another, i.e. the helical path of each of these fiber layers extend in opposite directions.

Each of the fiber layers is completely embedded in a resin (28), which is illustrated as a transparent material located between each of the fiber layers (27), as well as over and under the fiber layers.

The combination of the fiber layers (27) and the resin (28) together comprise the reinforcement section (41), as indicated in FIG. 13.

Above the uppermost layer (27) of fiber is a layer of resin (28), over which is positioned a layer of shear ply (29). Immediately over the layer of shear ply (29) is positioned the saddle (3). The layer of shear ply (29) extends slightly beyond the saddle, both in length and width. No lugs are illustrated in FIG. 13. A split supplemental shear ply (37) is positioned over the saddle (3), each portion of the supplemental shear ply (37) being positioned over a portion of the width of the saddle (3), along the edge thereof. The supplemental shear ply (37), together with the overwrap (7), serves to provide an added cushion and containment of the saddle (3).

Over the supplemental shear ply layer (37) are positioned a plurality of layers of fibers (32) which are embedded in, and serve to reinforce, a resin (31, illustrated as transparent). Together these layers of fiber and resin represent the overwrap (7). The fibers present in the overwrap (7) are all oriented around the circumference of the rocket's outer casing (9), i.e. in a direction generally perpendicular to the axis of the rocket. Unlike the wall reinforcement section (27), the axes of the fibers (33) in the overwrap (7) are all positioned in substantially parallel alignment with one another.

The attachment assembly of the present invention is utilized for the purpose of attaching a pressure vessel to virtually any other object. The other object could be another rocket engine, an aircraft fuselage, or even a stationary object. However, the preferred pressure vessel is a booster rocket motor, and the preferred "other object" is a main rocket motor. Preferably, the booster rocket motor is a solid propellant motor, and preferably the main rocket engine is a liquid propellant rocket motor.

Although the attachment assembly may be used to permanently affix the pressure vessel to the object, the attachment assembly is preferably used in conjunction with a means for detachment, in order to produce a releasable attachment of the pressure vessel to the other object.

The wall of the pressure vessel (i.e. the outer casing of the pressure vessel, 9) is preferably as described above, i.e. the casing preferably expands slightly upon pressurization of the vessel. In general, the wall of the pressure vessel can be constructed of any material capable of withstanding the forces to which the wall is subjected during use. Preferred materials for construction of the wall are steel, aluminum, titanium, and a fiber-reinforced resin. The attachment assembly of the present invention is useful for rocket engines having outer casings comprising composites such as fiber reinforced plastics, as well as rocket casings comprising metals such as steel, aluminum, etc.

If the wall of the pressure vessel is constructed to minimize weight, as is desired in the design of rocket motors, it becomes necessary to reinforce the wall at the section thereof at which an attachment assembly is attached thereto. Reinforcement is necessary here because the wall would otherwise be subject to a substantial risk of structural failure due to shear produced between the expanded wall and a rigid strap attached to the wall, as discussed above. In general, any means for reinforcing a section of the pressure vessel wall may be used. The means is located on the outer casing of the pressure vessel.

The wall reinforcement section (41) on the outer casing of the pressure vessel can be located anywhere over, within, or under the outer casing. That is, the wall reinforcement section (41) may be positioned on top of the outer casing, and bonded to the outermost surface of the casing, as is shown in FIGS. 1-4, 6, 7, and 13, or may be positioned inside of the outer casing, bonded to the inner surface of the casing. The wall reinforcement section may even be positioned within the casing itself, i.e. the casing could be constructed around the wall reinforcement section. The wall reinforcement section (41) has the effect of reinforcing that portion of the wall at which the attachment assembly is affixed, so that the remaining portion of the casing may be constructed of an overall lighter design, i.e. of lesser wall thickness.

The wall reinforcement section (41) comprises a plurality of layers of fiber (27) embedded in a resin (28). In general, the resin (28) may be any resin which is compatible with the fiber and which can withstand the conditions of use while simultaneously reinforcing the wall section. Preferably, the resin (28) is at least one member selected from the group consisting of an epoxy resin and a phenolic resin. Most preferably the resin is an epoxy resin.

In general, the resin (28) is present in the reinforcement section in an amount which, when mixed with the reinforcing fibers, produces a wall reinforcement section (41), i.e. a section of the wall of the pressure vessel wherein there is reinforcement to a desired degree. Preferably, the resin is present in the reinforcement section in an amount of from about 27 weight percent to about 47 weight percent, based on the combined weight of the fiber layers (27) and the weight of the resin (28). Most preferably, the resin is present in the reinforcement section in an amount of about 37 weight percent.

In general, the reinforcing fiber present in the wall reinforcement section may be any fiber which is compatible with the resin and which can withstand the conditions of use while simultaneously producing a reinforced wall section. Preferably, the fiber is at least one member selected from the group consisting of a graphite fiber, fiberglass fiber, and aramid fiber. Most preferably, the fiber is a graphite fiber.

In general, the reinforcing fiber is arranged as a plurality of layers, wherein each layer is a set of parallel yarns and/or fibers. The layers of fibers illustrated in FIG. 13. Although any number of fiber layers effective to produce an adequate degree of reinforcement may be utilized, preferably from about 8 layers of fiber to about 20 layers of fiber are present in the reinforcement section. Although the fibers may, in general, be present in any form which results in adequate reinforcement, the fibers are preferably present as 11 layers.

In general, the fiber is present in the reinforcement section in an amount which, when combined with the resin, produces a wall reinforcement section. Preferably, the fiber is present in the reinforcement section in an amount of from about 53 weight percent to about 73 weight percent, based on the combined weight of the fiber layers (27) and the weight of the reinforcing resin (28). Most preferably, the fiber is present in the reinforcement section in an amount of about 63 weight percent.

In the wall reinforcement section (41), a plurality of resin impregnated fiber layers are placed in a stacked relationship. However, the layers of fiber are positioned whereby the fibers cross one another. Preferably, the adjacent layers of fiber designated with an "X" in FIG. 13 cross one another at an angle of about 90 degrees, with each layer being angled at about 45 degrees with respect to the axis of the rocket. Preferably, the fibers in the layer designated with an "O" in FIG. 13 cross the fibers in the "X" fiber layers at an angle of about 45 degrees, since the fibers in the "O" layers cross the axis of the rocket at an angle of about 90 degrees. Preferably, every third layer of fiber has the same direction of fiber orientation.

Preferably the reinforcement section (41) is positioned around the entire circumference of the pressure vessel. By extending the reinforcement section (41) around the entire circumference of the pressure vessel, a higher degree of reinforcement may be produced.

A layer of shear ply (29) is positioned over the reinforcement section. The shear ply serves as a means for absorbing shear forces produced by the expansion of the outer casing or the pressure vessel during a period of use of the pressure vessel. The shear ply (29) is constructed from a resilient material. In general, the material should be resilient enough to prevent damage to the outer casing of the pressure vessel during a period of use of the pressure vessel. Preferably, the resilient material is at least one member selected from the group consisting of a styrene-butadiene rubber (i.e. SBR), an acrylonitrile-butadiene rubber (i.e. NBR), an ethylene-propylene-diene rubber (i.e. EPDM). Most preferably, the resilient material is a styrene-butadiene rubber.

In general, the shear ply (29) should have a thickness which, when combined with the degree of resilience of the shear ply, prevents damage to the outer casing due to expansion of the pressure vessel during a period of use thereof. Preferably, the thickness of the shear ply (29) is from about 0.02 inch to about 0.12 inch. Most preferably, the thickness of the shear ply is about 0.08 inch.

Although the length and width of the shear ply can be any length and width which adequately reduces the shear forces produced by the expansion of the outer casing against the saddle, the shear ply preferably has a length and width at least as large as the saddle which is positioned over the shear ply.

An adhesive adheres the shear ply over an outermost fiber-reinforced resin layer of the reinforcement section. Although in general any adhesive capable adhering to both the uppermost layer of the reinforcement section as well as the lowermost layer of the reinforcement section is satisfactory so long as it is also capable of withstanding the forces, temperatures, and pressures, during use of the pressure vessel, preferably the adhesive is at least one member selected from the group consisting of an epoxy adhesive and a phenolic adhesive. Most preferably, the adhesive is an epoxy adhesive.

A saddle is positioned over the shear ply. The saddle has at least two lugs thereon, wherein the lugs are attached to the saddle with a means for attachment thereof. The saddle is merely one example of the genus of means for providing at least two points of attachment to the pressure vessel, wherein the means for providing at least two points of attachment to the pressure vessel is positioned over the means for reinforcing the pressure vessel wall. Preferably, the saddle has a center lug and a plurality of side lugs thereon.

Preferably, the saddle extends only partially around the circumference of the pressure vessel. The saddle preferably extends only partially around the circumference of the pressure vessel in order to reduce the weight of the assembly, as well as the efficient use of materials of construction.

The saddle is preferably a rigid, inflexible member which, if extended around the entire circumference of the pressure vessel, would tend to increase the risk of damage to the pressure vessel upon expansion of the pressure vessel during use. Preferably, the saddle has a length which extends only part way around the circumference of the outer casing of the rocket, i.e. from about 45 degrees to about 225 degrees. Most preferably, the saddle extends about 100 degrees around the circumference of the rocket's outer casing. In general, the thickness of the saddle may be any thickness suited to the conditions of use of the pressure vessel and the saddle. Preferably, the saddle has a thickness of from about 0.05 inch to about 0.5 inch. Most preferably, the saddle has a thickness of about 0.3 inch.

In general the saddle may be constructed from any material suited to the conditions of use of the pressure vessel. Preferably, the saddle is constructed from at least one composition selected from the group consisting of steel, aluminum, titanium, and a fiber-reinforced, cured polymeric resin.

Most preferably, the saddle is steel. Preferably, the saddle, the center lug, and the two side lugs are all made of the same composition, wherein the composition is at least one member selected from the group consisting of steel, aluminum, titanium, and a fiber-reinforced, cured polymeric resin. Most preferably, the steel saddle has a steel center lug and two steel side lugs welded thereto, whereby the saddle, the center lug, and the side lugs are one unitary device.

Optionally, the attachment assembly of the present invention may further comprise a supplemental layer of shear ply (37). This supplemental layer of shear ply is positioned on top of the saddle, i.e. between the saddle and the overwrap. This supplemental layer of shear ply is also constructed of a resilient material, preferably the same resilient material from which the shear ply layer below (i.e. shear ply layer 29, as shown in FIGS. 6, 7, and 13) is constructed. The purpose of the supplemental layer of shear ply (37) is to accomodate differential expansion between the saddle and the overwraps.

In general, the supplemental layer of shear ply (37) has a thickness effective to retain the saddle on the case if the saddle-to-casing bond fails. Preferably, the supplemental layer of shear ply (37) has a thickness of from about 0.06 inch to about 0.12 inch, most preferably a thickness of about 0.08 inch. Preferably, the supplemental layer of shear ply is present in two portions, each portion being located along and over each long side of the saddle (3), as is illustrated in FIG. 13, described above. The supplemental layer of shear ply (37) is held in the attachment assembly by the overwrap (7) which forces the supplemental layer of shear ply (37) against the saddle (3).

The attachment assembly of the present invention further comprises an overwrap (7). The overwrap is positioned over at least a portion of the saddle (3), wherein the overwrap secures the saddle against the shear ply (29). The overwrap functions as a means for securing in place the means for providing at least two points of attachment to the pressure vessel.

In general, the overwrap (7) may comprise any means for securing the saddle (3) against the shear ply (29). Preferably, the overwrap (7) comprises a resin (31) having a plurality of layers of fiber (32) embedded therein. This arrangement is illustrated in FIG. 13.

In general, the overwrap may comprise any number of layers of fiber which ensure that the overwrap adequately secures the saddle (3) to the shear ply (37) positioned below the saddle (3). Preferably, the overwrap comprises from 5 to 15 layers of fiber (32) embedded in the resin (31). Most preferably, the overwrap comprises 7 layers of fiber embedded in the resin.

In general, the organic resin can be any resin which satisfactorily serves to secure the saddle to the shear ply below the saddle. Preferably, the organic resin is at least one member selected from the group consisting of an epoxy resin and a phenolic resin.

In general, the resin can be present in the overwrap in any amount effective to perform the purposes of the overwrap. Preferably, the resin is present in the overwrap in an amount of from about 25 weight percent to about 33 weight percent, based on the weight of the overwrap. Most preferably, the resin is present in the overwrap in an amount of about 29 weight percent, based on the weight of the overwrap.

In general, the fiber in the overwrap can be any fiber which satisfactorily serves to secure the saddle to the shear ply below the saddle. Preferably, the fiber is at least one member selected from the group consisting of a fiberglass fiber, graphite fiber, and aramid fiber. Most preferably the fiber is a fiberglass fiber.

In general, the fiber can be present in the overwrap in any amount effective to perform the purposes of the overwrap. Preferably, the fiber is present in the overwrap in an amount of from about 61 weight percent to about 81 weight percent, based on the weight of the overwrap. Most preferably, the fiber is present in the overwrap in an amount of about 71 weight percent, based on the weight of the overwrap. Preferably the fiber present in the overwrap is a continuous filament fiber, as opposed to a staple fiber.

Preferably, the overwrap is positioned around the entire circumference of the pressure vessel, as opposed to around only a portion of the circumference of the pressure vessel. By extending around the entire circumference of the pressure vessel, the overwrap is a continuous band having greater strength because the multiple layers of fiber and resin serve to reinforce one another more, and are further supported by the various layers underneath.

The attachment assembly of the present invention further comprises a connecting means for connecting a first end of a strut to at least one of the lugs affixed to the saddle (i.e. to at least one of the attachment points). A second end of the strut is connected to the other object (e.g. a main rocket engine) with an attachment means therefor. Although the connecting means may be made from any material suited to connecting the strut to the lug, preferably the connecting means is made from a material selected from the group consisting of steel, aluminum, titanium, and a fiber reinforced polymeric material. Most preferably, the connecting means is made from steel.

The connecting means has a means for engaging the lug as well as a means for attachment to the strut. The connecting means preferably comprises the T-element, the ball element, the ring element, the annular clamp element, and the flared end on the strut. See FIGS. 2, 3, 4, 6, and 8–12. The T-element (5) slidably engages a slot in a center lug (4). The T-element also threadedly engages the ball element (6) having threads therein. As is evident from FIGS. 2, 3, and 6, the connecting means serves as a pivotable joint.

Although the attachment assembly of the present invention comprises a plurality of lugs affixed to the saddle, preferably only one lug is attached to a strut member which attaches the pressure vessel to the other object. Preferably, the lug which is attached to the strut member is the center lug, i.e. a lug around which an even number of other lugs are preferably symmetrically arranged. Preferably the remaining lugs (i.e. the side lugs (8)) are attached to "thrust devices" (11). As used herein, the phrase "thrust device" is used with respect to a device which stabilizes the position of the pressure vessel with respect to the other object. For example, if there is one central lug (attached to a strut) flanked by two side lugs each of which is attached to a thrust device (11), as is most preferred, the pressure vessel is held to the other object by three contact points. That is, the thrust devices stabilize the position of the pressure vessel by maintaining a three-point contact with the other object. In addition to acting as stabilizers, the thrust devices (11) also serve to absorb shock and vibration.

Furthermore, the attachment means for connecting the second end of the strut to the second pressure vessel may comprise a concave depression in the second pressure vessel and an associated convex strut end. The fixed attachment at the center lug holds the rocket in place and a compressive load in each thruster holds the thruster in place and keeps the booster (i.e. the first pressure vessel) from moving side-to-side, stabilizing the booster rocket.

In the method of the present invention, in which the pressure vessel is attached to another object, the first step of the method is to construct the pressure vessel wall reinforcement section (41) on an outer casing (9) of the pressure vessel. The wall reinforcement section (41) comprises a plurality of layers of fiber embedded in a resin, wherein the layers of fiber are positioned across one another. The wall reinforcement section is constructed by applying each layer to the case in order of inside to outside. The angled (i.e. the fiber layers oriented ±45° to the axis of the casing are preferably hand laid up, and the fiber layers oriented 90° to the axis of the casing are preferably filaments which are wound thereon via machine).

Once the reinforcement section is formed, the next step in the process is that of adhering the layer of a shear ply to the outermost layer of the reinforcement section. The shear ply is adhered to the outermost layer of the reinforcement section by bonding the shear ply to the outermost reinforcement layer with structural epoxy adhesive.

Once the shear ply layer (29) is adhered to the outermost layer of the reinforcement section (41), the saddle (3) is positioned over the shear ply (29). Preferably, at least two lugs are securely attached to the saddle before the saddle is positioned over the shear ply.

After the lugged saddle is positioned, the overwrap (7) is applied over at least a portion of the saddle (3), so that the saddle (3) is secured against the shear ply (29). The overwrap is applied by filament winding process, preferably via machine.

After the overwrap is applied, the connecting means is installed on at least one of the lugs. Preferably, the lug is slotted and a head portion of a T-element is designed to precisely engage the slot. A ring member (14) is placed over the upwardly positioned threads of the T-element (5), following which the ball element (6) is threadedly engaged with the T-element (5) and preferably locked thereto by the tightening of a setscrew (20) located within the ball member (6). The flared end (40) of the strut (10) is then positioned against the ring member (14), following which an annular clamp (12) is positioned around both the ring member (14) and the flared end (40) of the strut (10), after which the clamp is tightened so that the ring member (14) is drawn tight against the flared end (40) of the strut (10).

In the practice of the process of the present invention, the second end of the strut is connected to the other object (i.e. the second pressure vessel), following which the first end of the strut is connected to the connecting means positioned on the first pressure vessel.

What is claimed is:

1. An attachment assembly for fastening a pressure vessel to another object, the attachment assembly comprising:
   A. a pressure vessel wall reinforcement section on an outer casing of the pressure vessel, wherein the wall reinforcement section comprises a plurality of layers of fiber embedded in a resin, wherein the layers of fiber are positioned across one another;
   B. a layer of shear ply positioned over the reinforcement section, wherein the shear ply is constructed from a resilient material, wherein an adhesive adheres the shear ply over an outermost fiber-reinforced resin layer of the reinforcement section, wherein the shear ply is resilient enough to prevent damage to the casing of the pressure vessel during a period of use of the pressure vessel;
   C. a saddle positioned over the shear ply, wherein the saddle has at least two lugs thereon, wherein the lugs are attached to the saddle with a means for attachment thereof;
   D. an overwrap positioned over at least a portion of the saddle, wherein the overwrap secures the saddle against the shear ply; and E. a connecting means for connecting a first end of a strut to at least one of the lugs, wherein a second end of the strut is connected to the other object with an attachment means therefor.

2. An attachment assembly as described in claim 1, wherein the pressure vessel comprises a first pressure vessel and the other object comprises a second pressure vessel.

3. An attachment assembly as described in claim 2, wherein the first pressure vessel comprises a first rocket motor and the second pressure vessel comprises a second rocket motor, and wherein the first rocket motor comprises a solid propellant and wherein the second rocket motor comprises a liquid propellant.

4. An attachment assembly as described in claim 1, wherein the resin present in the reinforcement section comprises at least one member selected from the group consisting of an epoxy resin, and a phenolic resin, and wherein the fiber present in the reinforcement section comprises at least one member selected from the group consisting of a graphite fiber, a fiberglass fiber, and an aramid fiber, and wherein the resin is present in the reinforcement section in an amount of from about 27 weight percent to about 47 weight percent, based on the weight of the reinforcement section, and wherein the fiber is present in the reinforcement section in an amount of from about 53 weight percent to about 73 weight percent, based on the weight of the reinforcement section.

5. An attachment assembly as described in claim 1, wherein from about 8 layers of fiber to about 20 layers of fiber are present in the reinforcement section, and wherein the layers of fiber are positioned across one another at an angle of from about 45 degrees to about 90 degrees, and wherein the reinforcement section is positioned around a circumference of the pressure vessel.

6. An attachment assembly as described in claim 1, wherein the shear ply comprises at least one composition selected from the group consisting of a styrene-butadiene rubber, an acrylonitrile-butadiene rubber, and an ethylene-propylene-diene rubber, and wherein the shear ply has a thickness of from about 0.02 inch to about 0.12 inch.

7. An attachment assembly as described in claim 1, wherein the saddle comprises at least one member selected from the group consisting of steel, aluminum, titanium, and a fiber-reinforced, cured polymeric resin, and wherein the saddle has a thickness of from about 0.05 inch to about 0.5 inch.

8. An attachment assembly as described in claim 7, wherein the saddle has a center lug and a plurality of side lugs thereon, and wherein the saddle, the lugs, and the connecting members comprise at least one member selected from the group consisting of steel, aluminum, titanium, and a fiber reinforced resin, and wherein the saddle passes around only a portion of a circumference of the pressure vessel.

9. An attachment assembly as described in claim 1, wherein the assembly further comprises a supplemental layer of a shear ply, wherein the supplemental layer of shear ply is positioned between the saddle and the overwrap, wherein the supplemental layer of shear ply comprises a resilient material.

10. An attachment assembly as described in claim 1, wherein the overwrap comprises a resin having a fiber embedded therein, wherein the resin comprises at least one member selected from the group consisting of an epoxy and a phenolic, and wherein the fiber comprises at least one member selected from the group consisting of fiberglass, graphite, and aramid, and wherein the overwrap passes around a circumference of the pressure vessel.

11. An attachment assembly as described in claim 10, wherein the overwrap comprises from 5 to 15 layers of fiber embedded in the resin.

12. An attachment assembly as described in claim 8, wherein the connecting means serves as a pivotable joint.

13. An attachment assembly as described in claim 12, wherein the pivotable joint comprises a ball and socket joint, and wherein the saddle, the lugs, and the connecting means comprise steel, and wherein a welded joint joins the lugs to the saddle.

14. An attachment assembly as described in claim 12, wherein the two side lugs are connected to devices for holding the pressure vessel in a desired position with respect to the other object.

15. An attachment assembly as described in claim 2, wherein the second pressure vessel comprises a metallic shell an an attachment lug.

16. An attachment assembly as described in claim 15, wherein the attachment means for connecting the second end of the strut to the second pressure vessel comprises a lug having a concave portion thereon.

17. An attachment assembly as described in claim 3,
wherein the reinforcement section comprises an epoxy resin in an amount of about 37 weight percent, based on the weight of the reinforcement section, and wherein the reinforcement section comprises a graphite fiber in an amount of about 63 weight percent, based on the weight of the reinforcement section, and wherein about 11 layers of fiber are present in the reinforcement section, and wherein the reinforcement section is positioned around a circumference of the pressure vessel; and
wherein the shear ply comprises styrene-butadiene rubber and has a thickness of about 0.08 inch; and
wherein the saddle comprises steel having a thickness of about 0.3 inch, and wherein the saddle extends around only a portion of the circumference of the pressure vessel, and wherein the saddle has a steel center lug and two steel side lugs unitary therewith; and
wherein the attachment assembly further comprises a supplemental layer of shear ply positioned over the saddle, wherein the supplemental layer of shear ply comprises styrene-butadiene rubber having a thickness of about 0.08 inch; and
wherein the overwrap comprises an epoxy resin which is present in an amount of about 29 weight percent, based on the weight of the overwrap, and wherein the overwrap comprises a fiberglass fiber present in an amount of about 71 weight percent, based on the weight of the overwrap, and wherein about 7 layers of fiber are present in the overwrap, and wherein the overwrap is positioned around the circumference of the pressure vessel; and
wherein the connecting means comprises a pivotable ball and socket joint which comprises a steel T-element, a steel ball element, a ring member, a flared strut end, and an annular clamp having an exploding bolt thereon; and
wherein the two side lugs are connected to devices for holding the pressure vessel in a desired position.

18. A method of attaching a pressure vessel to another object, the method comprising the steps of:

A. constructing a pressure vessel wall reinforcement section on an outer casing of the pressure vessel, wherein the wall reinforcement section comprises a plurality of layers of fiber embedded in a resin, wherein the layers of fiber are positioned across one another;

B. adhering a layer of a shear ply over an outermost layer of the reinforcement section, wherein the shear ply is constructed from a resilient material, wherein an adhesive adheres the shear ply over the outermost layer of the reinforcement section, wherein the shear ply is resilient enough to prevent damage to the casing of the first pressure vessel during a period of use of the pressure vessel;

C. positioning a saddle over the shear ply;

D. attaching at least two lugs onto the saddle;

E. applying an overwrap over at least a portion of the saddle so that the saddle is secured against the shear ply;

F. attaching a connecting means to at least one of the lugs;

G. connecting a first end of a strut to the connecting means;

H. connecting a second end of the strut to the other object.

19. A method as described in claim 18, wherein the pressure vessel comprises a first pressure vessel and the other object comprises a second pressure vessel.

20. A method as described in claim 19, wherein the first pressure vessel comprises a solid propellant booster rocket motor and the second pressure vessel comprises a liquid propellant main rocket motor.

21. A method as described in claim 19, wherein the resin present in the reinforcement section comprises at least one member selected from the group consisting of an epoxy resin and a phenolic resin; and wherein the fiber present in the reinforcement section comprises at least one member selected from the group consisting of a graphite fiber, a fiberglass fiber, and an aramid fiber; and wherein from about 8 layers of fiber to about 20 layers of fiber are present in the reinforcement section, and wherein the layers of fiber are positioned across one another at an angle of from about 45 degrees to about 90 degrees; and wherein the resilient material from which the shear ply is constructed comprises at least one composition selected from the group consisting of a styrene-butadiene rubber, an acrylonitrile-butadiene rubber, and an ethylene-propylene-diene rubber; and wherein the saddle comprises from at least one composition selected from the group consisting of steel, aluminum, titanium, a fiber-reinforced, cured polymeric resin, and wherein the saddle has a thickness of from about 0.05 inch to about 0.5 inch, wherein the method further comprises positioning a supplemental layer of a shear ply between the saddle and the overwrap, wherein the second layer is also constructed of a resilient material selected from the group consisting of a styrene-butadiene rubber, an acrylonitrile-butadiene rubber, and an ethylene-propylene-diene rubber; and wherein the overwrap comprises from 5 to 15 layers of a fiber, wherein the fiber comprises a member selected from the group consisting of graphite, fiberglass, and aramid, wherein the layers of fiber are embedded in a resin, wherein the resin comprises a member selected from the group consisting of an epoxy resin and a phenolic resin; and wherein the connecting means comprises a pivotable joint.

22. A method as described in claim 24, wherein the resin present in the reinforcement section comprises an epoxy resin, and wherein the fiber present in the reinforcement section comprises a graphite fiber, and wherein the reinforcement section comprises about 11 layers of fiber, and wherein the reinforcement section extends around a circumference of the pressure vessel; and wherein the shear ply comprises a styrene-butadiene rubber and wherein the shear ply has a thickness of about 0.08 inch; and wherein the saddle comprises steel, and wherein the saddle has a thickness of about 0.3 inch, and wherein the saddle is positioned around only a portion of the circumference of the pressure vessel; and wherein the method further comprises positioning a supplemental layer of a shear ply between the saddle and the overwrap, wherein the supplemental layer of shear ply comprises a styrene-butadiene rubber; and wherein the overwrap comprises about 7 layers comprising a fiberglass fiber, and wherein the layers comprising the fiberglass fiber are embedded in an epoxy resin, and wherein the overwrap extends around the circumference of the pressure vessel; and wherein the connecting means comprises a pivotable joint, wherein the pivotable joint comprises a T-element, a ball element, a ring member, a flared strut end, and an annular clamp having an exploding bolt thereon.

* * * * *

UNITED STATES PATENT AND TRADEMARK OFFICE
CERTIFICATE OF CORRECTION

PATENT NO. : 5,257,761
DATED : November 2, 1993
INVENTOR(S) : Otto G. Ratz and Richard E. Rynders It is certified that error appears in the above-identified patent and that said Letters Patent is hereby corrected as shown below:

In the Claims, Col. 18, line 22, "in claim 24," should read --in claim 21,--.

Signed and Sealed this

Twentieth Day of September, 1994

Attest:

BRUCE LEHMAN

Attesting Officer     Commissioner of Patents and Trademarks